US007186973B2

(12) United States Patent
Terui et al.

(10) Patent No.: US 7,186,973 B2

(45) Date of Patent: Mar. 6, 2007

(54) ION TRAP/TIME-OF-FLIGHT MASS ANALYZING APPARATUS AND MASS ANALYZING METHOD

(75) Inventors: Yasushi Terui, Tsuchiura (JP); Toyoharu Okumoto, Hitachinaka (JP); Tsukasa Shishika, Hitachinaka (JP); Shinji Nagai, Hitachinaka (JP); Masaru Tomioka, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 11/149,263

(22) Filed: Jun. 10, 2005

(65) Prior Publication Data

US 2005/0279926 A1 Dec. 22, 2005

(30) Foreign Application Priority Data

Jun. 11, 2004 (JP) ............................. 2004-173340

(51) Int. Cl.
*B01D 59/44* (2006.01)

(52) U.S. Cl. ....................................... 250/287; 250/281

(58) Field of Classification Search ................. 250/287
See application file for complete search history.

(56) References Cited

U.S. PATENT DOCUMENTS 5,171,991 A * 12/1992 Johnson et al. ............. 250/292
5,200,613 A * 4/1993 Kelley ......................... 250/282
5,420,425 A * 5/1995 Bier et al. .................. 250/292
5,448,061 A * 9/1995 Wells ......................... 250/282
5,569,917 A * 10/1996 Buttrill et al. .............. 250/292
6,498,340 B2 * 12/2002 Anderson et al. ........ 250/252.1
6,717,134 B2 * 4/2004 Bowdler ..................... 250/287
6,914,242 B2 * 7/2005 Mordehai ................... 250/288
6,977,374 B2 * 12/2005 Kawato ...................... 250/292
6,983,213 B2 * 1/2006 Wang .......................... 702/85
7,115,862 B2 * 10/2006 Nagai et al. ................ 250/292

(Continued)

FOREIGN PATENT DOCUMENTS

JP 2001-297730 10/2001

*Primary Examiner*—Jack Berman
*Assistant Examiner*—Bernard Souw
(74) *Attorney, Agent, or Firm*—Mattingly, Stanger, Malur & Brundidge, P.C.

(57) ABSTRACT

An "ion trap-TOF/MS" capable of calibrating the observed mass for each of an ion trap and a TOF. In the ion trap-TOF/MS, sample ions having known mass numbers and ionized by an ion source are trapped within an ion trap. Auxiliary AC voltages having a frequency component ω are applied to the end cap electrodes of the ion trap to expel unwanted ions out of the ion trap. A measurement process is carried out by applying DC voltages to the ring electrode and the end cap electrodes to expel an ion remaining within the ion trap, and measuring the mass number of the expelled ion by the time-of-flight mass spectrometer. The measurement process is repeated while changing the frequency component ω, and the ion signal intensity measured by the time-of-flight mass spectrometer is compared with a previously stored threshold, thereby making calibration of the frequency component ω for the ion having the known mass number. Thus, the calibrating of the observed mass can be realized for each of the ion trap and the TOF.

10 Claims, 7 Drawing Sheets

U.S. PATENT DOCUMENTS

| | | | | |
|---|---|---|---|---|
| 2005/0080578 | A1* | 4/2005 | Klee | 702/85 |
| 2005/0139763 | A1* | 6/2005 | Nagai et al. | 250/287 |
| 2005/0151073 | A1* | 7/2005 | Kato | 250/287 |
| 2005/0194529 | A1* | 9/2005 | Mordehai | 250/287 |
| 2005/0253060 | A1* | 11/2005 | Mimura et al. | 250/281 |
| 2005/0279926 | A1* | 12/2005 | Terui et al. | 250/287 |

* cited by examiner

ION TRAP/TIME-OF-FLIGHT MASS ANALYZING APPARATUS AND MASS ANALYZING METHOD

BACKGROUND OF THE INVENTION

1. Field of the Invention

The present invention relates to a mass analyzing apparatus including an ion trap and a time-of-flight mass spectrometer.

2. Description of the Related Art

Recently, a mass analyzing method has come into widespread use as a principal analyzing method in the fields of bioengineering and biochemistry. Such a trend is primarily attributable to development and improvement of ionization techniques and mass spectrometers adapted for applications to the biotechnological field.

As the ionization techniques, two ionization processes have been developed which are capable of directly and stably ionizing a thermally unstable sample molecule to be measured, which has a high molecular weight. One process is ESI (electrospray ionization) capable of directly taking, as an ion, a measured sample dissolved in a solution in an atmosphere. The other process is MALDI (matrix-assisted laser desorption ionization) that ionizes a sample molecule by irradiating a laser beam to the sample molecule. Those two ionization processes give an operator of the measurement different kinds of information, and hence they are employed in a complementary way in the biotechnological field.

Also, as a mass spectrometer adapted for applications to the biotechnological field, a time-of-flight mass spectrometer (TOF) is employed in many cases for the reason that a sample to be measured has a large molecular weight. With the recent progress of electronics, the TOF has become a more popular apparatus and its applications to a wide range including the biotechnological field are expected.

Because of having high sensitivity, a mass spectrometer in combination of the soft ionization process, such as ESI or MALDI, with the TOF has rapidly become widespread as an analytical technique in the biotechnological field. In many cases, however, an ion produced by the soft ionization process is a pseudo molecular ion $(M+H)^+$ in which a molecule is ionized with addition of a proton $H^+$ to the molecule. This fact has raised the problem that a measured mass spectrum provides only information of molecular weight, and hardly provides information regarding the molecular structure.

In order to overcome such a deficiency of information regarding the molecular structure, it has been proposed to provide an ion trap between an ESI ion source and the TOF such that mass measurement can be performed with high accuracy and an $MS^n$ analysis can be realized. This proposed process is disclosed in JP,A 2001-297730 (Patent Reference 1). The provision of the ion trap between the ESI ion source and the TOF makes it possible to repeat isolation or dissociation of an ion within the ion trap, and to realize the $MS^n$ analysis. The ion expelled out of the ion trap is introduced to an ion acceleration section of the TOF and is accelerated in a perpendicular direction in sync with the introduction of the ion. High accuracy in mass measurement can be achieved with an arrangement that the direction in which the ion is introduced is set perpendicular to the direction in which the ion is accelerated.

SUMMARY OF THE INVENTION

However, such an ion trap - TOF mass analyzing apparatus having the perpendicularly coupled arrangement has caused a new problem as follows. Because the ion expelled out of the ion trap is directly introduced to the ion acceleration section of the TOF, a range of mass number measurable with one cycle of acceleration is narrowed due to a restricted ion accumulation capability on the ion trap side, and a wide measurable range of mass number, i.e., an excellent feature of the TOF, is hardly utilized.

To overcome that problem, a mass analyzing apparatus is proposed which includes, between the ion trap and the TOF, a collision damping region for reducing kinetic energy of the ion expelled out of the ion trap. The mass analyzing apparatus (hereinafter referred to as the "ion trap-TOF/MS") including the collision damping region between the ion trap and the TOF has succeeded in obtaining information regarding the molecular structure of a sample molecule to be measured with high mass accuracy over a wide range of mass number based on the $MS^n$ analysis.

In other words, the "ion trap-TOF/MS" is a hybrid mass spectrometer comprising two mass spectrometers, i.e., the ion trap and the TOF. For that reason, the "ion trap-TOF/MS" requires calibration of the observed mass for each of the ion trap and the TOF. Also, from the viewpoint of ensuring measurement sensitivity, the ion introduced from the ion trap to the TOF is required to have constant kinetic energy in the collision damping region.

Accordingly, it is an object of the present invention to provide an "ion trap-TOF/MS" capable of calibrating the observed mass for each of an ion trap and a TOF.

To achieve the above object, the present invention provides an ion trap/time-of-flight mass analyzing apparatus including an ion source for ionizing a measurement sample, an ion trap having a ring electrode and a pair of end cap electrodes and trapping ions produced by the ion source therein, and a time-of-flight mass spectrometer, wherein the ion trap traps the sample ions, which are ionized by the ion source, having known mass numbers, applying the auxiliary AC voltages having the frequency component $\omega$ to the end cap electrodes of the ion trap to expel unwanted ions out of the ion trap, carrying out a measurement process by applying DC voltages to the ring electrode and the end cap electrodes to expel an ion remaining within the ion trap, and measuring the mass number of the expelled ion by the time-of-flight mass spectrometer, and repeating the measurement process while changing the frequency component $\omega$, and comparing the ion signal intensity measured by the time-of-flight mass spectrometer with a previously stored threshold, thereby making calibration of the frequency component $\omega$ for the ion having the known mass number.

Also, the present invention provides an ion trap/time-of-flight mass analyzing apparatus including the same components as those in the above mass analyzing apparatus, wherein ion trap traps the sample ions, which are ionized by the ion source, having known mass numbers, scanning a main RF voltage applied to the ring electrode of the ion trap up to an arbitrary voltage value V to expel unwanted ions out of the ion trap, carrying out a measurement process by applying DC voltages to the ring electrode and the end cap electrodes to expel an ion remaining within the ion trap, and measuring the mass number of the expelled ion by the time-of-flight mass spectrometer; and repeating the measurement process while changing the voltage value V and comparing the ion signal intensity measured by the time-of-flight mass spectrometer with a previously stored threshold, thereby making calibration of the voltage value V for the ion having the known mass number.

According to the present invention, the calibration of observed mass can be made for an ion trap section of the ion trap-TOF/MS.

DESCRIPTION OF THE PREFERRED EMBODIMENTS

Figure 7:
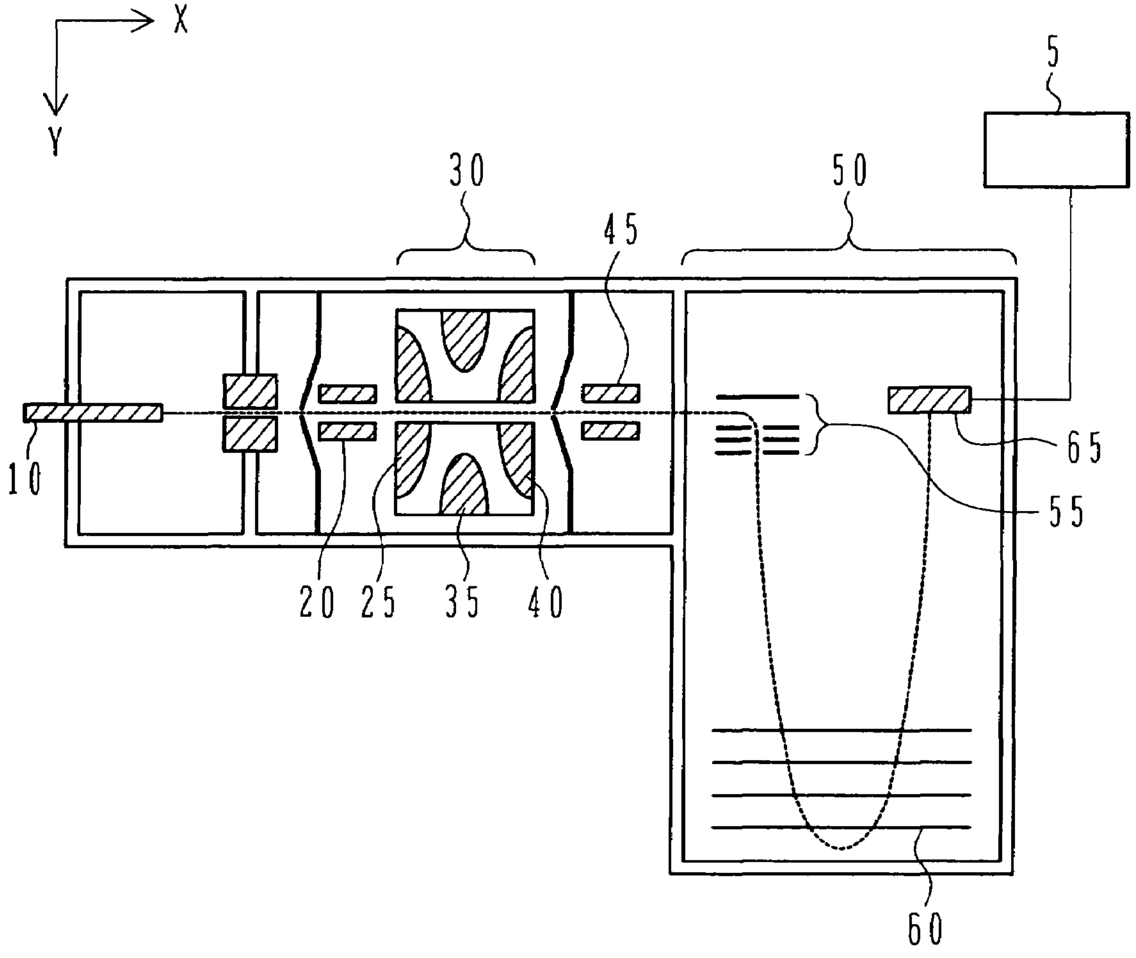
FIG. 7 is a schematic view of an ion trap/time-of-flight mass analyzing apparatus according to the present invention.

FIG. 7 is a schematic view of an ion trap/time-of-flight mass analyzing apparatus ("ion trap-TOF/MS") according to the present invention.

Each of sample ions ionized by an ion source 10 is introduced to an ion trap 30 after passing through a first multi-electrode ion guide 20. The first multi-electrode ion guide 20 corrects the kinetic energy of the sample ion and converges an ion beam to be matched with incident conditions of the ion trap 30. It is here assumed that the direction in which the ion beam advances is an X-direction and the direction in which the ion is accelerated by an acceleration section 55 of a TOF 50 is a Y-direction. The sample ion introduced to the ion trap 30 is trapped within the ion trap 30 by application of a main RF voltage to a ring electrode 35. After the trapping, unwanted ions are expelled out of the ion trap 30 by application of auxiliary AC voltages to a first end cap electrode 25 and a second end cap electrode 40. The sample ion remaining within the ion trap 30 is expelled out of the ion trap 30 by application of DC voltages to the first end cap electrode 25, the ring electrode 35 and the second end cap electrode 40, and is then introduced to a second multi-electrode ion guide 45. By adjusting the respective DC voltages applied to those electrodes, the sample ion can be expelled out of the ion trap 30 at low kinetic energy. A gas is introduced to the second multi-electrode ion guide 45 externally of the apparatus so that the second multi-electrode ion guide 45 serves as a collision damping region. The introduced sample ion collides with the gas in the second multi-electrode ion guide 45, whereupon the kinetic energy of the sample ion reduces. Thereafter, the sample ion is introduced to the acceleration section 55 of the TOF 50 and is accelerated in the Y-direction. The accelerated sample ion is reflected by a mirror lens 60 forming an electric field in a direction opposed to the acceleration direction, and then reaches a detector 65. Because the sample ion is accelerated at a certain voltage, an ion having a smaller mass number reaches the detector 65 at an earlier point in time, i.e., a shorter arrival time and an ion having a larger mass number reaches the detector 65 at a later point in time, i.e., a longer arrival time. By measuring the arrival time of each of the sample ions, the sample ions are separated from one another in terms of mass. A control unit 5 collects ion intensity signals detected by the detector 65. With the collection of the ion intensity signals, a mass spectrum can be obtained with the control unit 5.

The control unit 5 includes a display unit (not shown), such as a display, and input units (not shown), such as a keyboard and a pointing device, to thereby display a mass spectrum, i.e., a measured result, and set parameters for various apparatus components. Also, based on the set parameters, the control unit 5 controls various apparatus components including the ion source 10, the ion trap 30, and the TOF 50.

Because the "ion trap-TOF/MS" according to the present invention is a hybrid mass spectrometer comprising the ion trap 30 and the TOF 50 coupled to each other, calibration of the observed mass is required for each of the ion trap 30 and the TOF 50. Also, because ion separation in terms of mass is actually made by the TOF 50, the calibration of the observed mass for the TOF 50 requires to be performed before the calibration of the observed mass for the ion trap 30.

Moreover, in the "ion trap-TOF/MS" according to the present invention, the sample ion is accelerated in the acceleration section 55 in the Y-direction, while the kinetic energy of the sample ion in the X-direction is preserved on that occasion. For that reason, the ion incident upon the TOF 50 must be introduced to enter the TOF 50 at a speed resulting from dividing the distance between the acceleration section 55 and the detector 65 in the X-direction by the time of flight of the sample ion.

Hitherto, the calibration of the observed mass for the ion trap 30 has been performed through the steps of applying the auxiliary AC voltages to the first end cap electrode 25 and the second end cap electrode 40 at the same time as applying the main RF voltage to the ring electrode 35, thereby causing resonance of an electric field to expel the sample ion out of the ion trap 30 (namely, resonance extraction), and measuring the mass number of the expelled ion. However, the kinetic energy of the ion expelled with the resonance extraction may reach several keV at the maximum depending on the mass number, and such high kinetic energy cannot be reduced to a sufficiently low level by the second multi-electrode ion guide 45. Therefore, the speed of the sample ion often substantially exceeds a level that is to be realized at the time when the sample ion enters the TOF, and the sample ion can no longer be observed for measurement.

In contrast, according to the present invention, the calibration of the observed mass for the TOF 50 is first performed by applying DC voltages to the ring electrode 35 and both the end cap electrodes 25, 40 of the ion trap 30 so as to establish a state where the sample ion passes through the ion trap 30 without being trapped in the ion trap 30. Then, after expelling unwanted ions out of the ion trap 30 by the resonance extraction, for example, the calibration of the observed mass for the ion trap 30 is performed using at least one ion remaining within the ion trap 30.

(First Embodiment)

Figure 1:
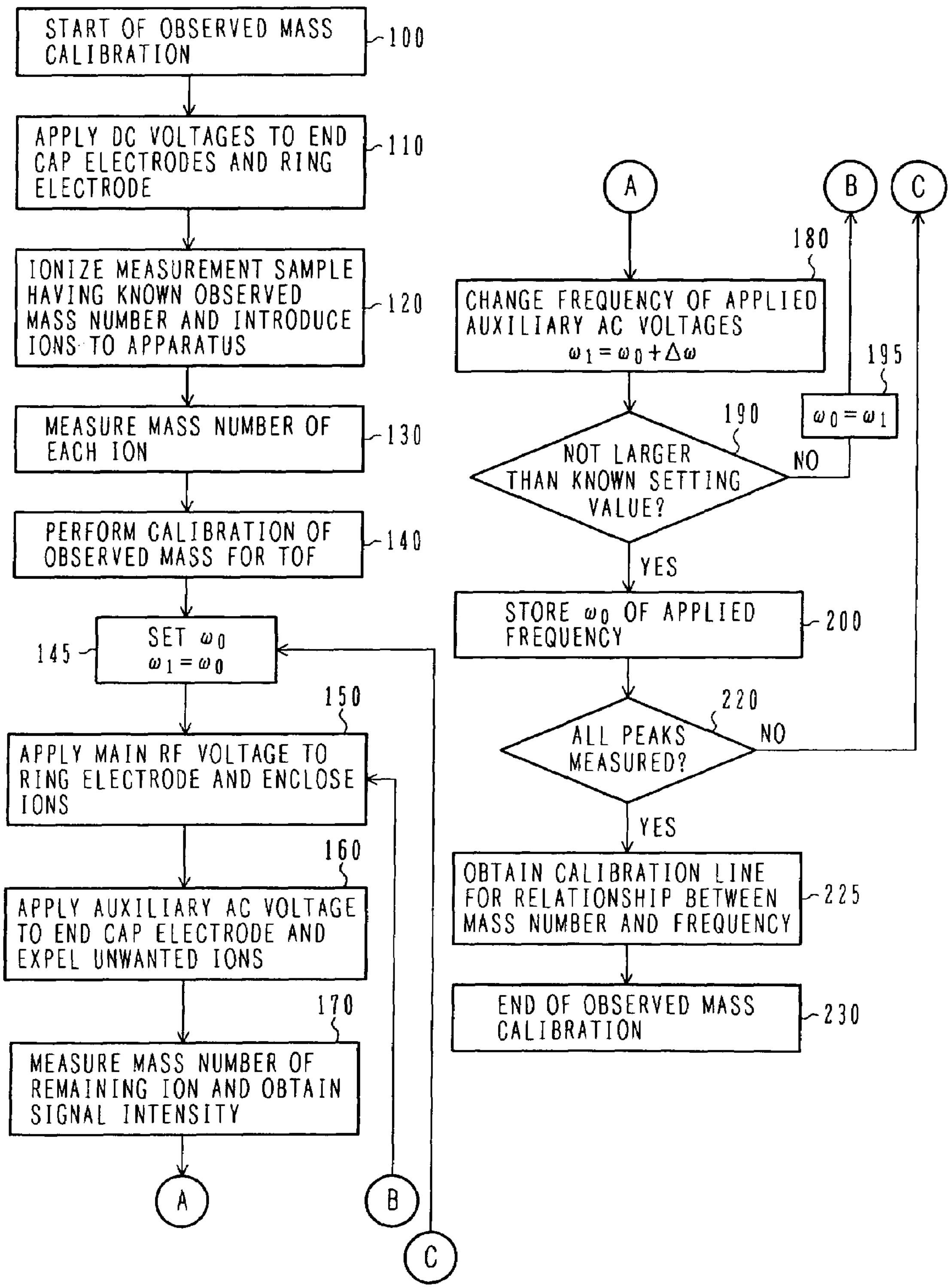
FIG. 1 is a flowchart showing an observed mass calibration sequence executed in a first embodiment of the present invention.

A first embodiment of the present invention is shown in FIGS. 1 to 3. FIG. 1 is a flowchart showing an observed mass calibration sequence executed in the first embodiment, and FIGS. 2A to 2E and 3A to 3D each show a set of mass spectra for explaining successive steps of the sequence.

As mentioned above, because the "ion trap-TOF/MS" is a hybrid mass spectrometer comprising the ion trap and the TOF coupled to each other, the calibration of the observed mass is required for each of the ion trap and the TOF. Also, because the mass number is actually measured by the TOF, the calibration of the observed mass for the TOF requires to be performed before the calibration of the observed mass for the ion trap.

Figure 2A:
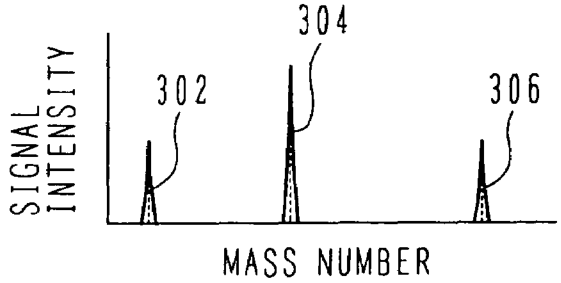
FIGS. 2A to 2E show a set of mass spectra for explaining the operation of the first embodiment.
Figure 2B:
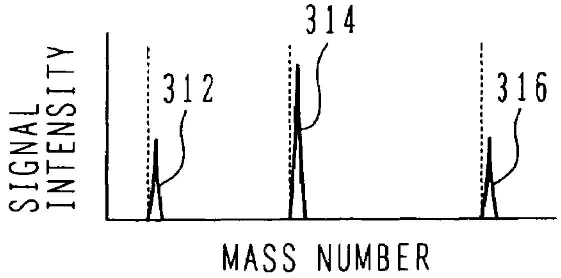

In view of those requirements, after the start of an observed mass calibration process (step 100), DC voltages are applied to the end cap electrodes 25, 40 and the ring electrode 35 of the ion trap 30 (step 110) to set the apparatus such that ions to be observed pass through the ion trap 30 without being trapped in the ion trap 30. Then, a measurement sample having the known mass number is ionized by the ion source 10 (step 120). The TOF 50 is operated to measure the mass number of the ionized measurement sample (step 130). FIG. 2A shows an inherent mass spectrum of the known measurement sample. The known mass spectrum of FIG. 2A is stored in the apparatus beforehand. FIG. 2B shows an actually measured spectrum of the measurement sample. Then, the measured mass number and the known mass number of the measurement sample are compared with each other to perform the calibration of the observed mass for the TOF (step 140). As shown in examples of FIGS. 2A and 2B, since peaks 312, 314 and 316 on the actually measured mass spectrum are shifted in mass number (i.e., along the mass axis) from peaks 302, 304 and 306 on the known mass spectrum of the measurement sample, respectively, such a shift is calibrated. The calibration of the TOF is thereby completed. The mass spectrum after the calibration is stored as a new defined value in a memory inside the apparatus (e.g., the control unit 5).

Then, setting of a frequency component $\omega_0$ of the auxiliary AC voltages is made which are applied to make only one ion corresponding to an arbitrary peak among the known peaks remain within the ion trap 30 while expelling the other ions out of the ion trap 30. The frequency component $\omega_0$ that is first set herein is selected to such a value as capable of trapping one peak on the smallest mass number side among the plurality of known peaks which have been obtained in step 130 and subjected to the mass number calibration in step 140, and as capable of forming a mass number window positioned as close as possible to the smallest mass number side. That value can be set as one of the parameters from the control unit 5 by an operator of the measurement. Further, $\omega_0$ is set as a frequency component $\omega_1$ of the auxiliary AC voltages that are applied to the end cap electrodes 25, 40 of the ion trap 30 (step 145).

Figure 2C:
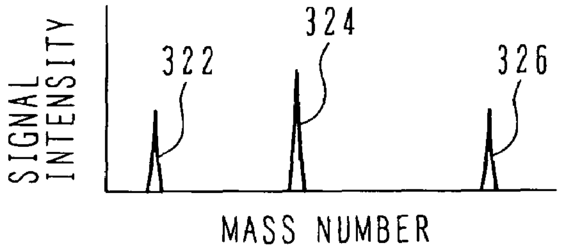

Then, the known measurement sample is ionized and introduced to the ion trap 30 again, and a main RF voltage for enclosing ions in a wide mass number range is applied to the ring electrode 35 of the ion trap 30 so that the ions having the known mass numbers are enclosed within the ion trap 30 (step 150). As shown in FIG. 2C, the ions present within the ion trap 30 are three ions (322, 324 and 326) having similar respective mass numbers to those shown in FIG. 2B.

Figure 2D:
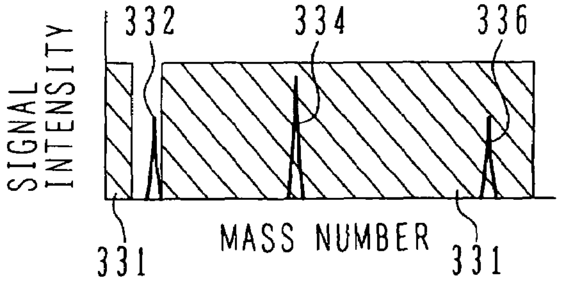

The auxiliary AC voltages each having the frequency component $\omega_0$ are applied to the end cap electrodes 25, 40 (step 160), thereby expelling the unwanted ions out of the ion trap 30. In a resulting initial state, ions in a region corresponding to a hatched area 331, i.e., two ions (334, 336), are expelled out of the ion trap 30, by way of example, as shown in FIG. 2D. Accordingly, the ion remaining within the ion trap 30 is only an ion 332 on the smallest mass number side.

Figure 2E:
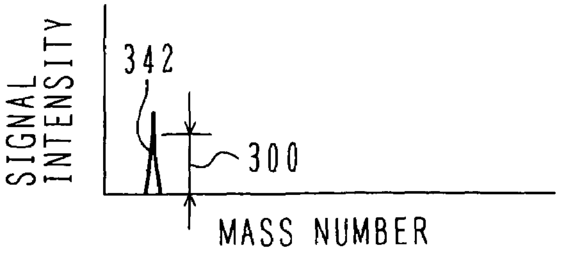

After cutting off the main RF voltage and the auxiliary AC voltages, only DC voltages are applied to the end cap electrodes 25, 40 and the ring electrode 35 so that the ion remaining within the ion trap 30 is expelled toward the second multi-electrode ion guide 45 at low kinetic energy based on the potential differences among those electrodes. Then, the mass number of the expelled ion is measured by the TOF 50 (step 170). When the unwanted ions are expelled as indicated by FIG. 2D, a mass spectrum shown in FIG. 2E is obtained and a signal intensity 342 is measured. Since the ion remaining within the ion trap 30 is expelled at low kinetic energy, the ion 332 on the smallest mass number side is sufficiently decelerated by the second multi-electrode ion guide 45 and hence can be observed.

Figure 3A:
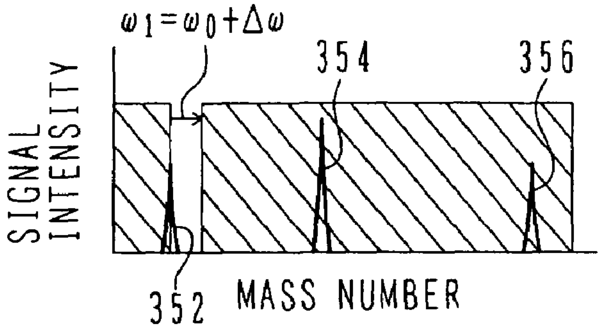
FIGS. 3A to 3D show a set of mass spectra for explaining the operation of the first embodiment.

Then, as shown in FIG. 3A, a frequency component $\omega_1$ of the auxiliary AC voltages applied to trap a new mass number region is computed (i.e., $\omega_1=\omega_0+\Delta\omega$) (step 180). In other words, a new setting value is decided for changing a region of mass number that can be trapped within the ion trap 30.

Then, the ion signal intensity observed in step 170 is compared with a known setting value, i.e., a peak of the mass spectrum obtained in step 140 at the same mass number (step 190). Here, the term "known setting value" means a signal intensity value preset for each of components (ions) in the measurement sample introduced in this observed mass calibration process, the value being stored in the memory (not shown) inside the apparatus. The known setting value serves as a threshold used in determining whether the relevant component ion is detected at sufficient intensity. In the case shown in FIG. 2C, for example, the known setting value for use in the comparison is previously selected for each of the three peaks 322, 324 and 326 prior to the start of this observed mass calibration process.

If a value of the measured ion signal intensity is larger than the known setting value, the frequency component $\omega$ of the auxiliary AC voltages computed in step 180 is set as the frequency component $\omega$ to be applied to the end cap electrodes 25, 40 (step 195), followed by returning to step 150 in which ions are enclosed within the ion trap.

Figure 3B:
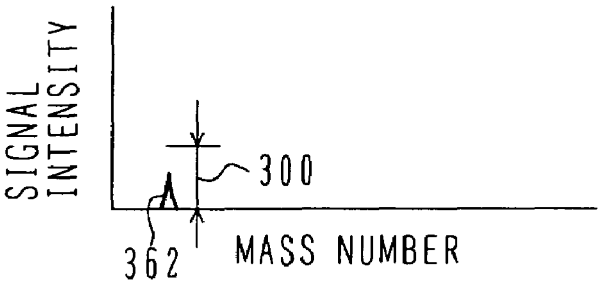

If the value of the measured ion signal intensity is not larger than the known setting value, e.g., if the mass number region used for expelling the unwanted ions is set in overlapped relation to a peak 352 on the smallest mass number side as shown in FIG. 3A and the detected ion signal intensity is lower than a known setting value 300 like a peak 362 on the smallest mass number side as shown in FIG. 3B, the ion mass number and the value of the frequency component $\omega_0$ at that time are stored (step 200). In other words, the optimum frequency component $\omega_0$ of the auxiliary AC voltages for trapping the known ion 322 is obtained here.

Figure 3C:
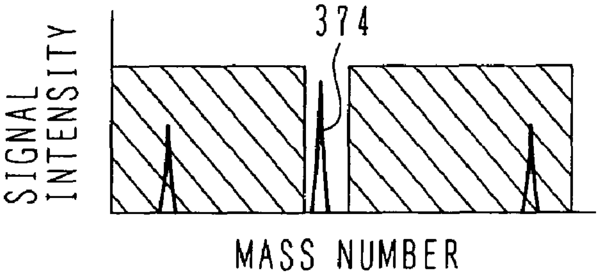

Then, it is determined whether the calibration is completed for all of the mass numbers to be observed (step 220). In other words, since there are three known peaks in this embodiment, it is determined whether the calibration is completed for the three peaks. If not completed, the process returns to step 145 in which, as shown in FIG. 3C, the frequency component $\omega_0$ for defining the unwanted-ion expelling region is set for a next known peak 374. Then, the processing of steps 150 to 220 is executed again.

Figure 3D:
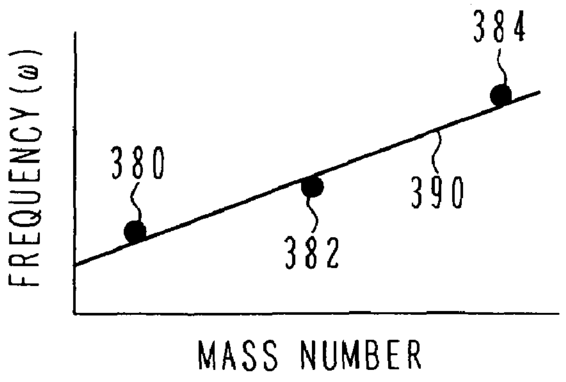
Figure 4:
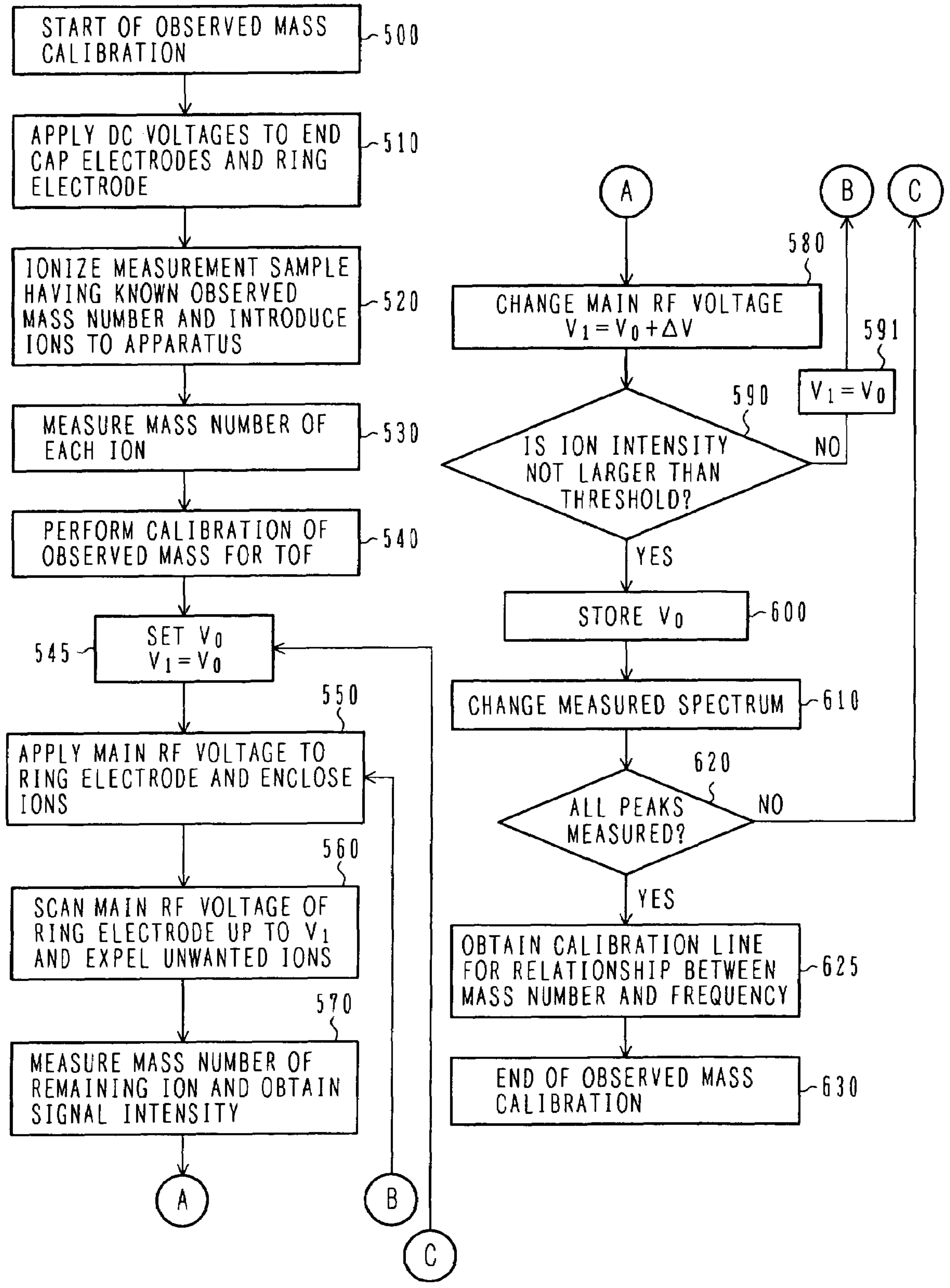
FIG. 4 is a flowchart showing an observed mass calibration sequence executed in a second embodiment of the present invention.

After the above-described processing is repeated the preset number of times (three times in this embodiment because there are three known peaks), a calibration curve 390 is obtained (step 225) by deriving a formula expressing the relationship between the mass number and the applied frequency component $\omega_0$ of the auxiliary AC voltages, as shown in FIG. 3D, based on data 380, 382 and 384 which are stored in step 200 and represent the mass numbers and the frequency components $\omega_0$ for the respective known peaks. The calibration curve 390 is used when an unknown sample is measured.

The observed mass calibration process for the ion trap is thereby brought to an end (step 230).

With this first embodiment, in the ion trap-TOF/MS, it is possible to easily perform the calibration of the frequency component $w_0$ of the auxiliary AC voltages applied to the ion trap.

(Second Embodiment)

A second embodiment of the present invention is shown in FIGS. 4 to 6D.

Figure 5A:
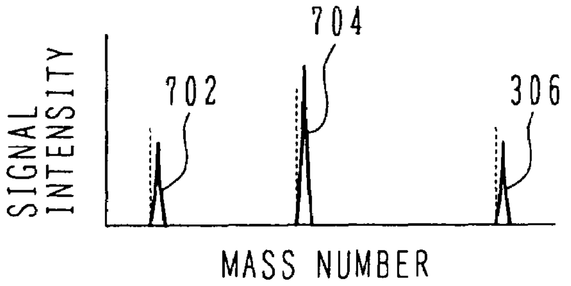
FIGS. 5A to 5E show a set of mass spectra for explaining the operation of the second embodiment.
Figure 5B:
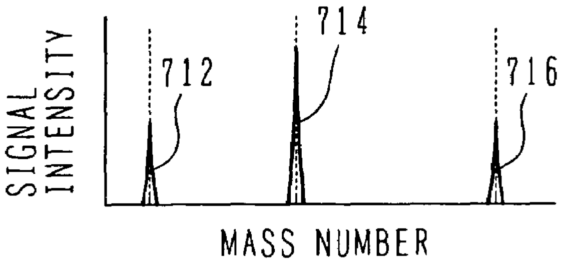

After the start of an observed mass calibration process (step 500), DC voltages are applied to the end cap electrodes 25, 40 and the ring electrode 35 of the ion trap 30 (step 510) to set the apparatus such that ions to be observed pass through the ion trap 30. Then, a measurement sample having the known mass number is ionized by the ion source 10 (step 520). The TOF 50 is operated to measure the mass number of the ionized measurement sample (step 530). The measured mass number and the known mass number of the measurement sample are compared with each other to perform the calibration of the observed mass for the TOF (step 540). By way of example, FIG. 5A shows an inherent mass spectrum of the known measurement sample, and FIG. 5B shows an actually measured spectrum of the measurement sample. The steps until this point are the same as those in the first embodiment. Since peaks 712, 714 and 716 on the actually measured mass spectrum are shifted from peaks 702, 704 and 706 on the known mass spectrum of the measurement sample, respectively, such a shift is calibrated. The calibration of the TOF is thereby completed.

Then, a voltage value $V_0$ of the main RF voltage is set such that the known peak remains as a peak on the smallest mass number side within the ion trap 30, while ions having the mass numbers smaller than the known peak are expelled out of the ion trap 30. The voltage value $V_0$ that is first set herein is selected to such a value as capable of detecting even the peak on the smallest mass number side among the plurality of known peaks which have been obtained in step 530 and subjected to the mass number calibration in step 540. That value can be set as one of the parameters from the control unit 5 by an operator of the measurement. Further, $V_0$ is set as an upper limit voltage value $V_1$ of the main RF voltage that is applied to the ring electrode 35 of the ion trap 30 (step 545).

Figure 5C:
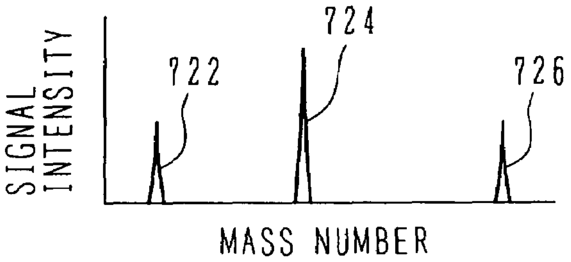

Then, the known measurement sample is ionized and introduced to the ion trap 30 again, and a main RF voltage for enclosing ions in a wide mass number range is applied to the ring electrode 35 of the ion trap 30 so that the ions having the known mass numbers are enclosed within the ion trap 30 (step 550). As shown in FIG. 5C, the ions present within the ion trap 30 are three ions (722, 724 and 726) having similar respective mass numbers to those shown in FIG. 5B.

Figure 5D:
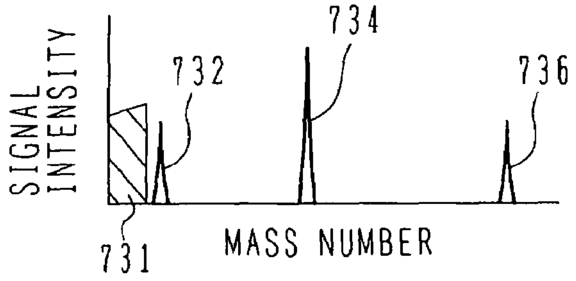

The main RF voltage applied to the ring electrode 35 is scanned so as to gradually increase up to the voltage value $V_1$, thereby expelling the unwanted ions out of the ion trap 30 (step 560). In a resulting initial state, ions in a region corresponding to a hatched area are expelled as the unwanted ions, while ions remaining within the ion trap 30 are those ones corresponding to the known peaks and having the mass numbers not smaller than the ion 732 on the smallest mass number side, by way of example, as shown in FIG. 5D.

Figure 5E:
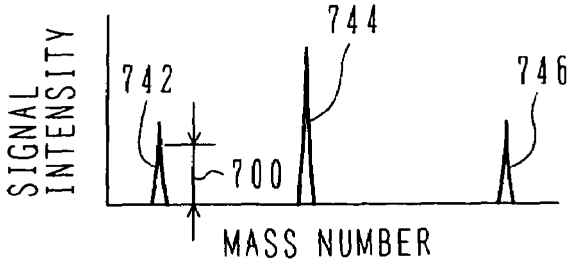

Then, DC voltages are applied to the end cap electrodes 25, 40 and the ring electrode 35 so that one or more ions remaining within the ion trap 30 are expelled toward the second multi-electrode ion guide 45 at low kinetic energy. The mass number and signal intensity of each expelled ion are measured by the TOF 50 (step 570). When the unwanted ions are expelled as indicated by FIG. 5D, three ions (742, 744 and 746) having respective corresponding mass numbers are observed as shown in FIG. 5E.

Then, the upper limit voltage value $V_1$ of the main RF voltage applied to the ring electrode 35 is changed as expressed by ($V_1=V_0+\Delta V$) (step 580). In other words, as shown at (a) in FIG. 6, the mass number region including ions to be expelled as the unwanted ions in step 560 is increased from the smallest mass number side.

Then, the signal intensity of one (i.e., the peak 742 in FIG. 5E) among the ions observed in step 570, which is positioned on the smallest mass number side, is compared with a known setting value 700 (step 590). Here, the term "known setting value" means a signal intensity value preset for each of components (ions) in the measurement sample introduced in this observed mass calibration process, the value being stored in the memory (not shown) inside the apparatus. The known setting value serves as a threshold used in determining whether the relevant component ion is detected at sufficient intensity. In the case shown in FIG. 5(*c*), for example, the known setting value for use in the comparison is previously selected for each of the three peaks 722, 724 and 726 prior to the start of this observed mass calibration process.

If a value of the measured ion signal intensity is larger than the known setting value, the voltage value $V_1$ of the main RF voltage computed in step 580 is set as the voltage value $V_0$ to be applied to the end cap electrodes 25, 40 (step 591), followed by returning to step 550 in which ions are enclosed within the ion trap.

Figure 6A:
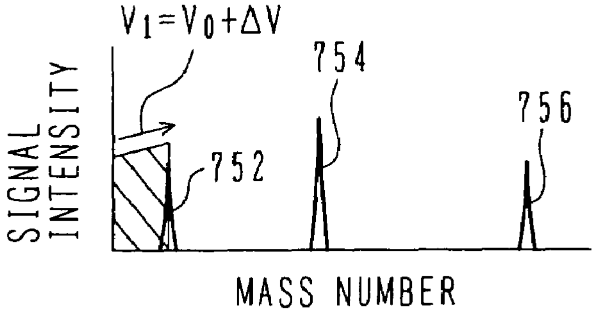
FIGS. 6A to 6D show a set of mass spectra for explaining the operation of the second embodiment.
Figure 6B:
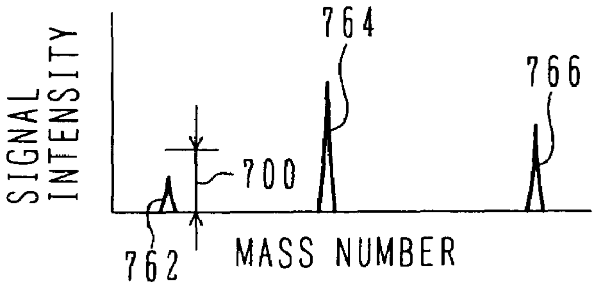

If the value of the measured ion signal intensity is not larger than the known setting value, e.g., if the mass number region used for expelling the unwanted ions is set in overlapped relation to a peak 762 on the smallest mass number side as shown in FIG. 6A and the detected ion signal intensity is lower than a known setting value 700 like a peak 752 on the smallest mass number side as shown in FIG. 6B, the ion mass number and the voltage value $V_0$ of the main RF voltage at that time are stored (step 600).

Figure 6C:
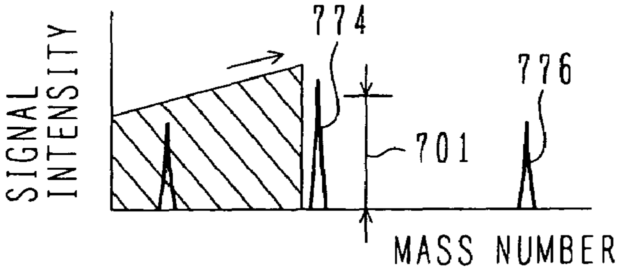

Then, it is determined whether the calibration is completed for all of the mass numbers to be observed (step 620). If not completed, the process returns to step 545 in which, as shown in FIG. 6C, the voltage value $V_0$ for defining the unwanted-ion expelling region is set for a next known peak 774. Then, the processing of steps 550 to 620 is executed again.

Figure 6D:
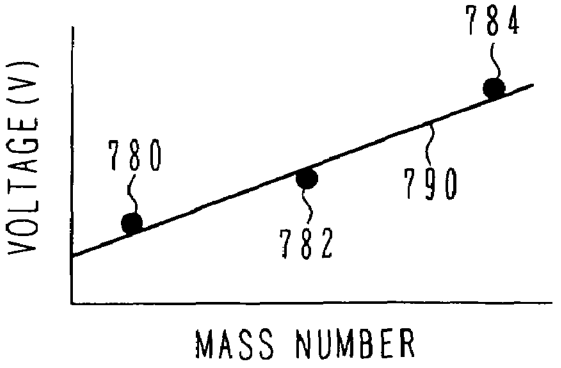

After the above-described processing is repeated the preset number of times (three times in this embodiment because there are three known peaks), a calibration curve 790 is obtained by deriving a formula expressing the relationship between the mass number and the voltage value $V_0$ of the main RF voltage, as shown in FIG. 6D, based on data 780, 782 and 784 which are stored in step 600 and represent the mass numbers and the voltage values $V_0$ for the respective known peaks (step 625). The calibration curve 790 is used when an unknown sample is measured.

The observed mass calibration process for the ion trap is thereby brought to an end (step 630).

With this second embodiment, in the ion trap-TOF/MS, it is possible to easily perform the calibration of the main RF voltage applied to the ion trap.

What is claimed is:

1. A mass analyzing method for use in an ion trap/time-of-flight mass analyzing apparatus including an ion source for ionizing a measurement sample, an ion trap having a ring electrode and a pair of end cap electrodes and trapping ions produced by said ion source therein, and a time-of-flight mass spectrometer, said method comprising the steps of:

ionizing sample ions having known mass numbers;

applying DC voltage to said ring electrode and end cap electrodes;

measuring mass numbers of said sample ions passing through said ion trap by said time-of-flight mass spectrometer;

calibrating said time-of-flight mass spectrometer by comparing measured mass numbers of said sample to said known mass numbers;

supplying sample ions having known mass numbers to said ion trap;

trapping said sample ions in said ion trap;

expelling unwanted ions out of said ion trap;

expelling ions remaining in said ion trap to said time-of-flight mass spectrometer;

measuring mass number of remaining ions expelled from said ion trap by said time-of-flight mass spectrometer; and calibrating control parameter of said ion trap by using mass numbers measured by said time-of-flight mass spectrometer.

2. The mass analyzing method according to claim 1, wherein said unwanted ions are expelled by applying AC voltage having a frequency component ω to said end cap electrodes, and said control parameter is said frequency component ω.

3. The mass analyzing method according to claim 1, wherein said unwanted ions are expelled by scanning a main RF voltage applied to said ring electrode up to an arbitrary voltage value V, and said control parameter is said voltage value V.

4. The mass analyzing method according to claim 2, further comprising the steps of repeating said measuring mass numbers of said sample ions having the known mass numbers while changing the frequency component ω, and obtaining a calibration curve based on a relationship between the frequency component ω and the mass number measured for each of the sample ions.

5. The mass analyzing method according to claim 3, further comprising the steps of repeating said measuring mass numbers of said sample ions having the known mass numbers while changing the voltage value V, and obtaining a calibration curve based on a relationship between the voltage value V and the mass number measured for each of the sample ions.

6. an ion trap/time-of-flight mass analyzing apparatus including an ion source for ionizing a measurement sample, an ion trap having a ring electrode and a pair of end cap electrodes and trapping ions produced by said ion source therein, a time-of-flight mass spectrometer, and a control unit for controlling said ion source and said time-of-flight mass spectrometer, wherein said control unit comprises means for trapping ions in a predetermined mass number range within said ion trap and setting a frequency component ω of auxiliary AC voltages applied to said end cap electrodes to expel ions in the other mass number range, and wherein said control unit performs the steps of:

ionizing sample ions having known mass numbers;

applying DC voltage to said ring electrode and end cap electrodes;

measuring mass numbers of said sample ions passing through said ion trap by said time-of-flight mass spectrometer;

calibrating said time-of-flight mass spectrometer by comparing measured mass numbers of said sample to said known mass numbers;

supplying sample ions having known mass numbers to said ion trap;

trapping said sample ions in said ion trap;

expelling unwanted ions out of said ion trap;

expelling ions remaining in said ion trap to said time-of-flight mass spectrometer;

measuring mass number of remaining ions expelled from said ion trap by said time-of-flight mass spectrometer; and calibrating control parameter of said ion trap by using mass numbers measured by said time-of-flight mass spectrometer.

7. The ion trap/time-of-flight mass analyzing apparatus according to claim 6, wherein said unwanted ions are expelled by applying AC voltage having a frequency component ω to said end cap electrodes, and said control parameter is said frequency component ω.

8. The ion trap/time-of-flight mass analyzing apparatus according to claim 7, wherein said unwanted ions are expelled by scanning a main RF voltage applied to said ring electrode up to an arbitrary voltage value V, and said control parameter is said voltage value V.

9. The ion trap/time-of-flight mass analyzing apparatus according to claim 7, wherein said control unit performs the operations of repeating said measuring mass numbers for plurality of said sample ions having the known mass numbers while changing the frequency component ω, and obtaining a calibration curve based on a relationship between the frequency component w and the mass number measured for each of the sample ions.

10. The ion trap/time-of-flight mass analyzing apparatus according to claim 8, further comprising the steps of repeating said measuring mass numbers for the plurality of said sample ions having the known mass numbers while changing the voltage value V, and obtaining a calibration curve based on a relationship between the voltage value V and the mass number measured for each of the sample ions.

* * * * *